United States Patent [19]
Wada et al.

[11] Patent Number: 5,448,694
[45] Date of Patent: Sep. 5, 1995

[54] FIGURE DISPLAYING SYSTEM AND FIGURE DISPLAYING METHOD USING SAME

[75] Inventors: Yuji Wada; Munenori Maeda, both of Kawasaki, Japan

[73] Assignee: Fujitsu Limited, Kawasaki, Japan

[21] Appl. No.: 109,265

[22] Filed: Aug. 20, 1993

[30] Foreign Application Priority Data

Jan. 27, 1993 [JP] Japan .................................. 5-011717

[51] Int. Cl.6 ............................................. G06F 15/66
[52] U.S. Cl. .................................................. 395/152
[58] Field of Search ............... 395/133, 131, 122, 130, 395/135, 119, 152; 358/400, 403, 450

[56] References Cited

U.S. PATENT DOCUMENTS 5,261,041 11/1993 Susman ................................. 395/152
5,267,047 11/1993 Argenta et al. ...................... 358/400

Primary Examiner—Phu K. Nguyen
Attorney, Agent, or Firm—Staas & Halsey

[57] ABSTRACT

A device, for managing rendering information of a figure included in a display instruction of the figure by an identifier of the figure, is provided separately from an application processor. The application processor supplies an instruction to a figure display processor by using a figure operation instruction part executing the operation of the figure including a metamorphosis. By a special request for a metamorphosis instruction, a shape information in the rendering information is updated to the shape information after metamorphosing, and thus, the shape of an objective figure to be displayed can be changed easily.

8 Claims, 12 Drawing Sheets

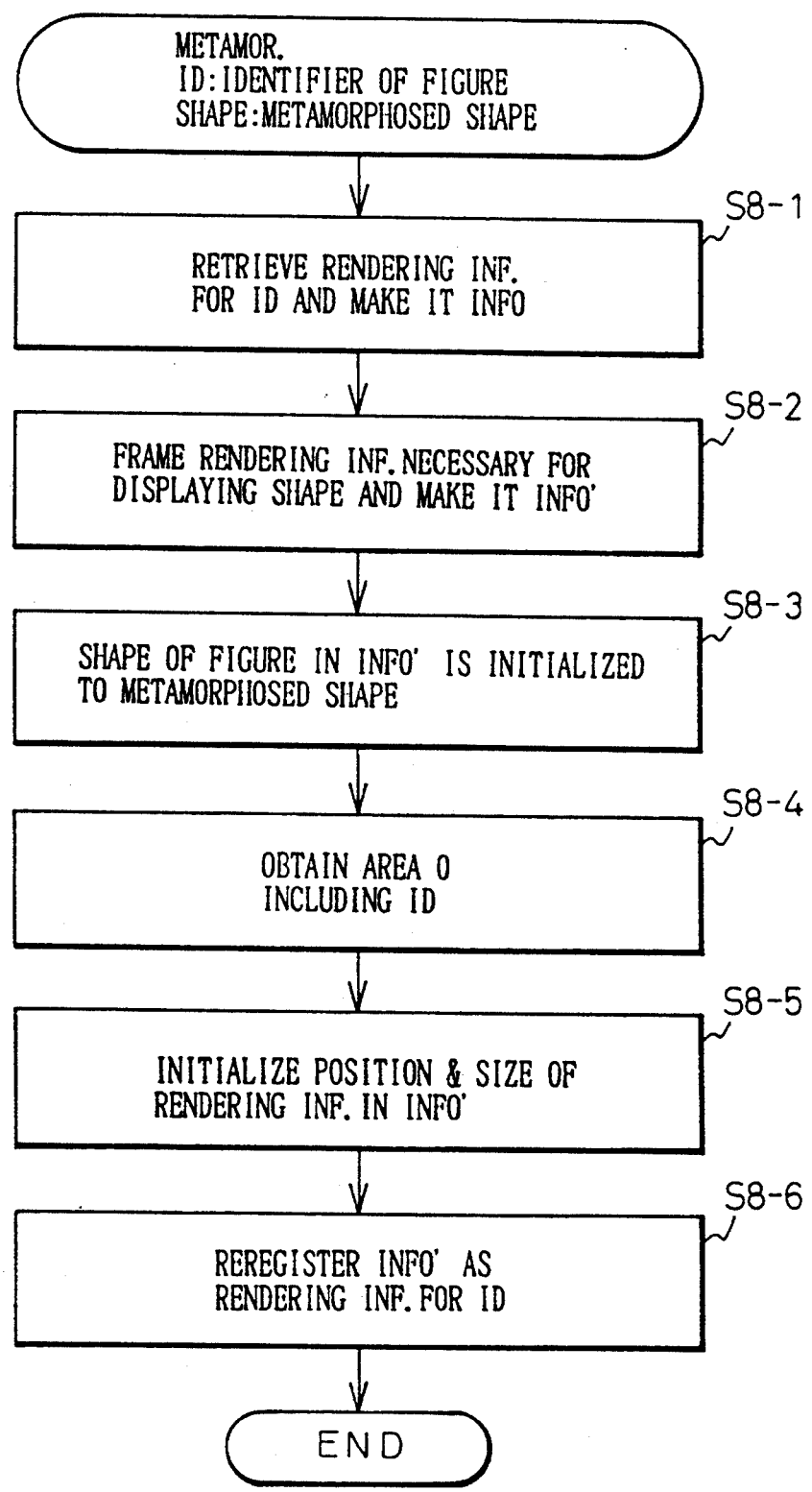

Fig.10

1) circle=FRAME(CIRCLE, P0, R);

2) character=FRAME(CHARA., P1, "CHARA.");

3) DISPLAY(circle);

4) DISPLAY(character);

5) METAMOR. (circle, POINT);

6) MOVEMENT(character, P2);

FIGURE DISPLAYING SYSTEM AND FIGURE DISPLAYING METHOD USING SAME

BACKGROUND OF THE INVENTION

1. Field of the Invention

The present invention relates to a figure displaying system and a figure displaying method using the same.

In accordance with developments in computer technology, application programs for displaying graphics by using a computer, wherein higher visual effects are necessary, have been developed. For example, computer graphics or animation technologies belong to the above technical field. In these application programs, to get higher visual effects, a complicated and advanced display is necessary and the realization of such a display has been difficult.

Under the circumstances, if a highly functionary figure displaying tools which support a visual display are provided, a computer graphics of an animation program is easily implemented and the contributions are great.

2. Description of the Related Art

A conventional system includes an application processing part, a figure displaying processor, and a display unit. The application processing part and the display unit are connected to the figure displaying processor. The application processing part manages rendering information.

The display unit outputs a figure on a CRT (cathode ray tube) display. The application processing part generates display instructions to display a figure, and transmits the display instructions to the figure display processor. The figure display processor displays the figure on the display unit in accordance with display instructions sent from the application processing part. The figure display processor is provided as various forms, for example, a program library, window system, or the like, and is one of most important parts of current graphical user interface. The display instructions are instructions for the figure display processor to execute display, erase, move, magnify, and reduce.

In a figure display system, the figure display processor can display a figure in accordance with the display instructions and it is possible for a plurality of figures to be displayed on the display unit by supplying a plurality of display instructions from the application processing part. However, generally in a conventional figure display system, the application processing part manages rendering information, for example, shape, position, and size of the figure, and such detailed rendering information must be supplied to the figure display processor with the display instructions. Thus, there are the following problems.

(A) Lack of functions for managing information necessary to display the figure (B) Insufficient functions for changing the shape of a figure (C) Lack of functions for changing behavior of the figure according to the change of the shape of a figure (D) Lack of functions for handling the composite figure which combines a plurality of figures A detailed description of the above problems is stated hereinafter with reference to drawings.

SUMMARY OF THE INVENTION

An object of the present invention is to change the shape or behavior of a figure easily by providing means for managing rendering information of the figure included in a display instruction of a figure, different from an application processing part, for solving the above problems.

A figure displaying system according to the present invention includes a processing unit, and an input unit and a display unit which are connected to the processing unit. The processing unit includes an application processor, a figure operation instruction part, a figure display processor and a rendering information managing part.

The processing unit further includes a CPU (central processing unit) and a memory, and processes data by executing the programmed instructions. The input unit inputs data or position information from a keyboard or a pointing device. The display unit displays the figure on a CRT or a liquid-crystal display.

The application processor comprises an application program or the like which displays a figure according to the request of a user. The figure display processor displays the figure on the display unit when it receives instructions from the application processor. The rendering information managing part manages both an identifier of the figure displayed on the display unit and corresponding rendering information including the shape and the position information of the figure, retrieves the rendering information from the identifier, and changes the rendering information. The figure operation instruction part is a means to operate the figure including at least framing, extinction (EXT.), display, erasion, and metamorphosis (METAMOR.) of the figure. The application processor instruct the figure display processor using such instructions. Such instructions then are supplied to the application processor as functions or commands.

The figure display processor retrieves rendering information from the rendering information managing part as response to a processing request by the figure operation instruction part from the application processor, determines the shape and behavior of the figure in accordance with the rendering information, displays the figure on the display unit, and converts the shape information included in the rendering information to a metamorphosed shape information when it receives a processing request of a metamorphosis instruction.

It is preferable that the figure display processor further includes a display instruction filtering part which determines and selects whether instructions are appropriate or not to the figure. The instruction changes the rendering information in response to the shape of the figure from the application processor through the figure operation instruction part, and if the display instruction is not appropriate, a predetermined error process starts.

It is preferable that the rendering information managing part has a managing means dealing with as a whole a plurality of rendering information by using the identifier of the figure given to the composite figure constituted of a plurality of rendering information and the figure display processor executes the instructed process to a plurality of figures, in accordance with a plurality of rendering information defined by the identifier in the case of where the identifier of the figure included in the instruction from the application processor through the figure operation instruction portion is the identifier of the composite figure.

Other features and advantages of the invention will be apparent from the following description with reference to the accompanying drawings.

BRIEF DESCRIPTION OF THE DRAWINGS

FIG. 8 is a flowchart showing a metamorphosing process using a figure display processor in the embodiment;

FIG. 10 is an explanatory diagram showing an application example according to the present invention;

DESCRIPTION OF THE PREFERRED EMBODIMENTS

Prior to the explanation of the embodiment, of the present invention, problems to be solved by the invention are explained with reference to drawings.

Figure 1A:
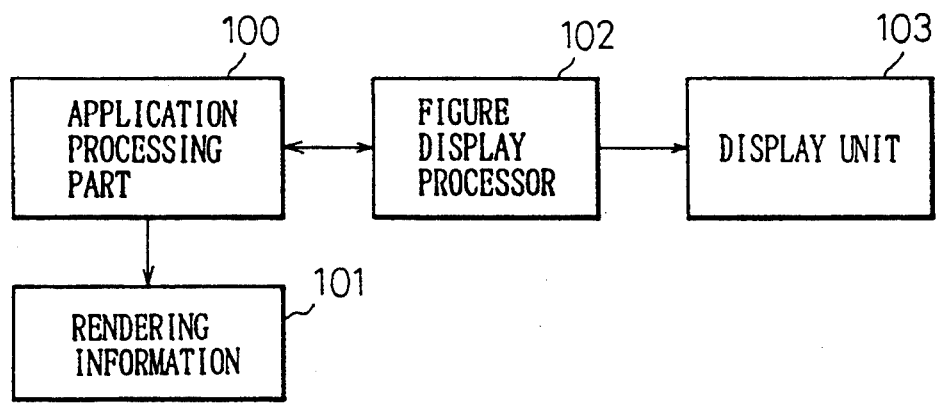
FIG. 1A is a block diagram explaining a conventional figure displaying system.
Figure 1B:
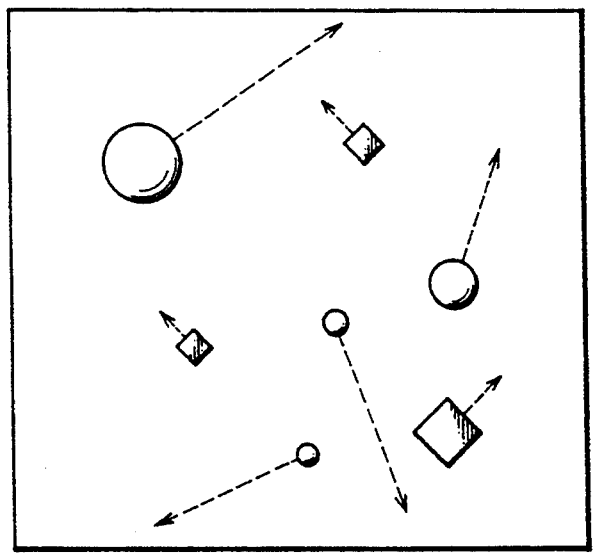
FIG. 1B and FIG. 1C are explanatory diagrams showing problems in the conventional figure displaying system.

(A) Lack of functions for managing information needed to display a figure:

For example, it is assumed that particles moving randomly in a closed space is displayed. As shown in FIG. 1B, particles moving at high speed are displayed as circles, and other particles are displayed as squares. Further, particles having a larger mass are displayed by a larger circle or square. Collisions between particles, between a particle and a wall, or the like, the speed or mass of the particle changes every movement. Thus, the particle display changes continuously.

When such particles are displayed by using a conventional figure display processor 102 (FIG. 1A), an application processing part 100 must behave as follows:

Display of movement

For example, it is assumed that a particle indicated as a circle and having a position $P_0$ moves to a position $P_1$.
(1) A display instruction to erase the circle mark at the position $P_0$ is supplied to the figure display processor 102.
(2) A display instruction to display the circle mark at the position $P_1$ is supplied to the figure display processor 102.

Display of speed change

For example, it is assumed that a circle mark is changed to a square mark.
(1) The position at which the circle mark is displayed is saved.
(2) A display instruction to erase the circle mark is supplied to the figure display processor 102.
(3) A display instruction to display the square mark at the saved position is supplied to the figure display processor 102.

Display of mass change

For example, it is assumed that a circle mark having radius of 5 is changed to a circle mark having radius of 10.
(1) The position at which the circle mark having a radius of 5 is displayed is saved.
(2) A display instruction to erase the circle mark having a radius of 5 is supplied to the figure display processor 102.
(3) A display instruction to display the circle mark having a radius of 10 at the saved position is supplied to the figure display processor 102.

The summarized results of the behavior of the application processor 100 in the case when the conventional figure display processor 102 is used, in the above three examples, are as follows:
(1) The rendering information (e.g., shape, position, size) of the figure (desired to be) erased is saved in a predetermined area of memory.
(2) The display instruction to storage the figure is supplied to the figure display processor 102.
(3) The updated shape and display position of the figure are determined, using the saved information.
(4) The display instruction to display the updated figure is supplied to the figure display processor 102.

As mentioned above, the application processing part 100 must manage the rendering information 101 which is necessary for the figure display processor 102 to display the figure.

(B) Insufficient functions for changing the shape of a figure:

As an example of displaying the speed change of the particle in the description (A), the change of the shape of the figure displayed on a display unit 103 is effective for the creation of the application program which is highly visual. However, these functions are not provided by the conventional figure display processor 102. Namely, the functions for changing the shape of the figure included in the rendering information 101 are not available in the application processing part.

(C) Lack of functions for changing behavior according to a change in shape of a figure:

As in the above example in (A), it is assumed that the circle mark is changed to a square mark. When the shape of the figure is a circle, it is proper that the display instruction supplied to the figure display processor 102 is changing the radius of the circle, moving the center point, or the like. After the circle mark is changed to a square mark, the above display instruction is not proper. Namely, the display instruction supplied to the figure display processor 102 changes in accordance with the shape of the figure. The functions to realize the change of the shape of the figure and the change of the behavior following the above change, are not provided in the conventional figure display system. Hereinafter the change of shape of a figure and the change of behavior following the change of shape are called "metamorphosis of the figure".

Figure 1C:
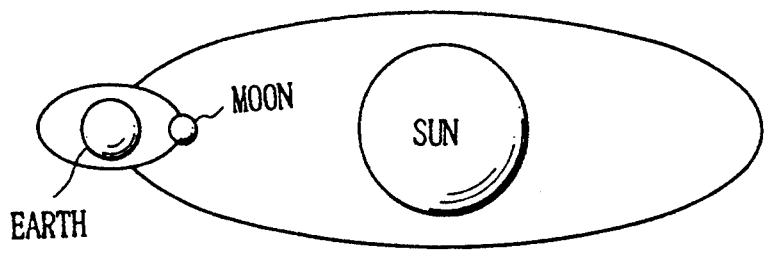

(D) Lack of functions for handling composite figures by combining a plurality of figures:

For example, as shown in FIG. 1C, suppose that the earth goes around the sun and the moon goes around the earth. In this case, it can be considered as follows:
(1) The earth goes around the sun.
(2) The moon also goes around the sun at the same speed as the earth.
(3) The moon goes around the earth.

The behavior of the application processing part 100 when the conventional display processor 102 is used, corresponding to the above items is as follows:
(1) The display instruction to move the figure representing the earth is supplied to the figure display processor 102 in response to the rotation of the earth around the sun.
(2) The display instruction to move the figure representing the moon, namely, the display instruction to move the figure as shown in this item (2) is supplied to the figure display processor 102, in response to the rotation of the moon around the sun.
(3) The display instruction to move the figure representing the moon is supplied to the figure display processor 102 in response to the rotation of the moon around the earth.

In the above (1) and (2), the behavior in which the different figures execute the same movement is displayed. However, the conventional figure display processor 102 has no function for handling different figures as one figure, accordingly the application processing part 100 cannot execute the simple behavior as shown in the followings.
(1) The display instructions to move the figure representing the earth and the figure representing the moon are supplied to the figure display processor 102, in response to the rotation of the earth and the moon rotates around the sun.
(2) The display instruction to move the figure representing the moon is supplied to the figure display processor 102, in response to the rotation of the moon around the earth.

Next, a summary of the invention is given with reference to drawings.

The figure is expressed by a pair of elements in the invention, namely, an identifier and rendering information. The identifier is distinguished the figure from the other figures. The rendering information includes the shape, size or the like of the figure. The shape of a figure which is given by the rendering information, can be one of the following.

FIG. 1 figure with no shape

Figure 2:
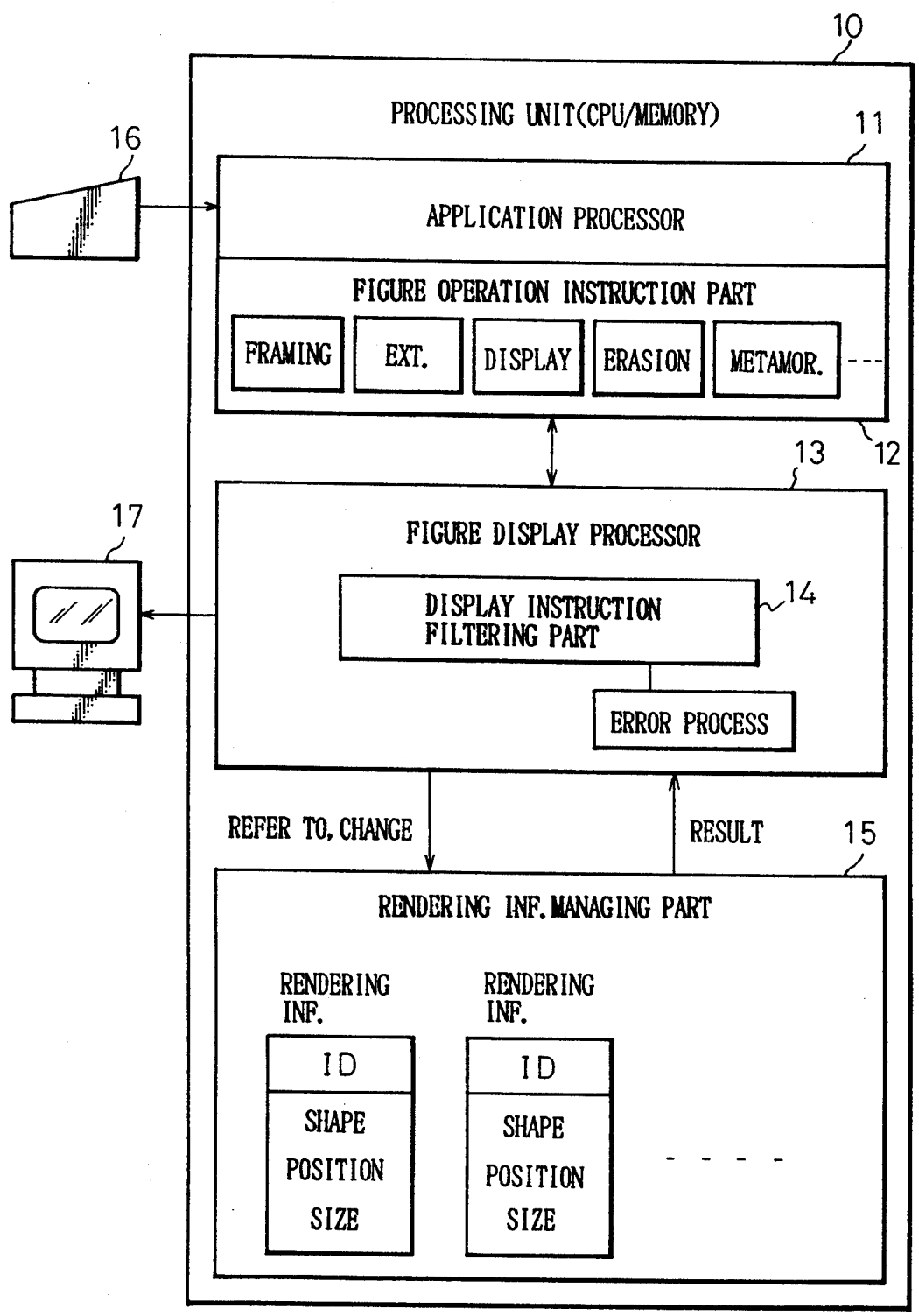
FIG. 2 is a block diagram of a figure display system according to an embodiment of the present invention.

FIG. 2 point, straight line, arc, circle, ellipse, polygon, or the like

Figure 3:
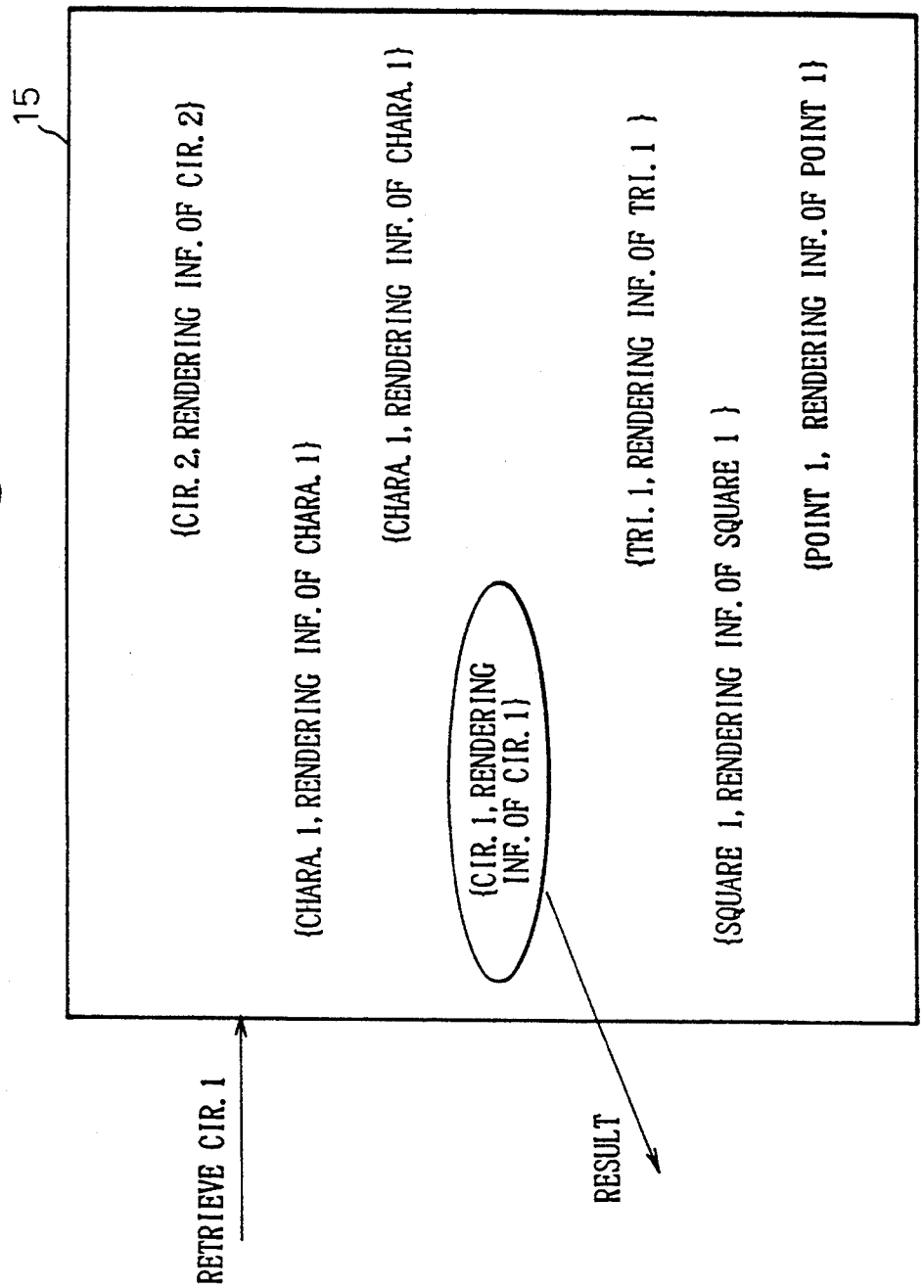
FIG. 3 is a diagram explaining management of rendering information according to the embodiment of the present invention.

FIG. 3 letters, numerals, marks, hiragana (Japanese characters), katakana (Japanese characters), kanji (Chinese characters), or the like FIG. 4 picture or pattern represented by some date format, e.g., bit-map or pix-map and so on According to the present invention, the problems in the conventional art described above are solved as follows.

Solution 1 for lack of functions for managing rendering information

In this invention, to solve this problem, a rendering information managing part 15 is provided. The rendering information managing part 15 manages the identifier and the rendering information of the figure as a whole, and functions in the same way as a database system. Namely, the rendering information managing part can retrieve the rendering information of a figure using the identifier of a figure as a key.

For example, when a display instruction for changing the rendering information of a figure A is supplied to the figure display processor 13, the following process is executed.
(1) The figure display processor 13 conveys the change of the rendering information of the figure A to the rendering information managing part 15.
(2) The rendering information managing part 15 retrieves the rendering information of the figure A from its managing rendering information and changes the information.
(3) The rendering information managing part 15 supplies the retrieved rendering information of figure A to the figure display processor 13.
(4) The figure display processor 13 displays the figure A on the display unit 17 using the rendering information of the figure A.

In the rendering information managed by the rendering information managing part 15, for example, when the shape of the figure is a circle, the position of the center, the radius, and the like are managed. In the case where the figure is a character string, the position, font, etc., of the character string displayed are managed. Thus, the management of the rendering information of the figure by the application processor 11 is not necessary.

Solution 2 for insufficiency of functions for changing the shape of a figure

In this invention, to solve this problem, the following method is used.

The shape of a figure included in the rendering information which is managed by the rendering information managing part 15 can be changed by a display instruction.

When the shape of the figure is changed the rendering information is converted to fit the new shape automatically.

For example, it is assumed that the shape of the figure is changed from a circle to a triangle.

For a figure having a circle shape, the position of the center and the radius are necessary as the rendering information to display the circle on the display unit 17. Further, for a figure having a triangle shape, the positions of three vertices are necessary. Accordingly when the shape of the figure is changed, the converting function of the rendering information is necessary.

Solution 3 for lack of functions for changing behavior according to the change of the shape of a figure In this invention, to solve this problem, a display instruction filtering part 14 is used. The display instruction filtering part 14 checks whether the instruction is appropriate based on the shape of the figure. When the display instruction is supplied to the figure display processor 13, the following processes are executed.
(1) The display instruction sent from the application processor 11 is received by the display instruction filtering part 14.
(2) The display instruction filtering part 14 refers to the rendering information which the rendering information managing part 15 manages, considers the shape of the figure, and determines whether the display instruction is appropriate or not. If appropriate, the figure display processor 13 executes the display instruction. If not appropriate, the display instruction is handled as an exception, for example handled as an error or ignored. In some cases, an error message is output.

(3) The figure display processor 13 handles the supplied display instruction.

Solution 4 for lack of functions for handling a plurality of figures as a group.

In this invention, to solve this problem, the following method is used.

The rendering information managing part 15 manages the identifier of the figure, the rendering information of the figure, and further the identifiers of managing figures to be handled as a group.

The function for displaying a plurality of figures as a group, on the display unit 17 is added to the function of the figure display processor 13.

For example, in the case where three figures i.e., a straight line, a circle, and a character string are moved together, the following process is executed.

(1) The application processor 11 transmits an instruction to group the straight line, the circle, and the character string together, to the figure display processor 13. Then, the figure display processor 13 registers the straight line, the circle, and the character string as a composite figure.

(2) The application processor 11 supplies an display instruction to move the composite figure to the figure display processor 13. Thus, the figure display processor 13 moves the each figure registered as a composite figure.

In this invention, the functionality of the figure display processor 13 is added as shown above, and the composite figure is handled the same as a noncomposite figure. Accordingly, the shape can be given to the composite figure and the change for the shape of the composite figure is made possible. Concretely, the composite figure has the following functions.

A plurality of figures are registered as a whole.

The shape can be changed the same as a usual figure.

If it has no shape, each shape of the registered figures are displayed.

If it has some shape (e.g., a triangle), the shape (a triangle) is displayed. At this time each of the shapes of the registered figures are not displayed.

Hereinafter, an embodiment of the invention is explained in detail with reference to drawings.

FIG. 3 is an explanatory diagram showing the management of rendering information according to the embodiment of the invention.

A figure is specified by an identifier and rendering information. The identifier distinguishes the figure from the other figures. The rendering information includes of the shape, size, and the like of the figure. The rendering information managing part 15 manages the identifier and the rendering information of the figure together as shown in FIG. 3. For example, if the name of the figure "CIRCLE 1" (an identifier) is retrieved, as a result, "rendering information of CIRCLE 1" is output. The application processor 11 specifies a display instruction only by the name of the figure, and the retrieve process is executed by the figure display processor 13 and the rendering information managing part 15.

Figure 4:
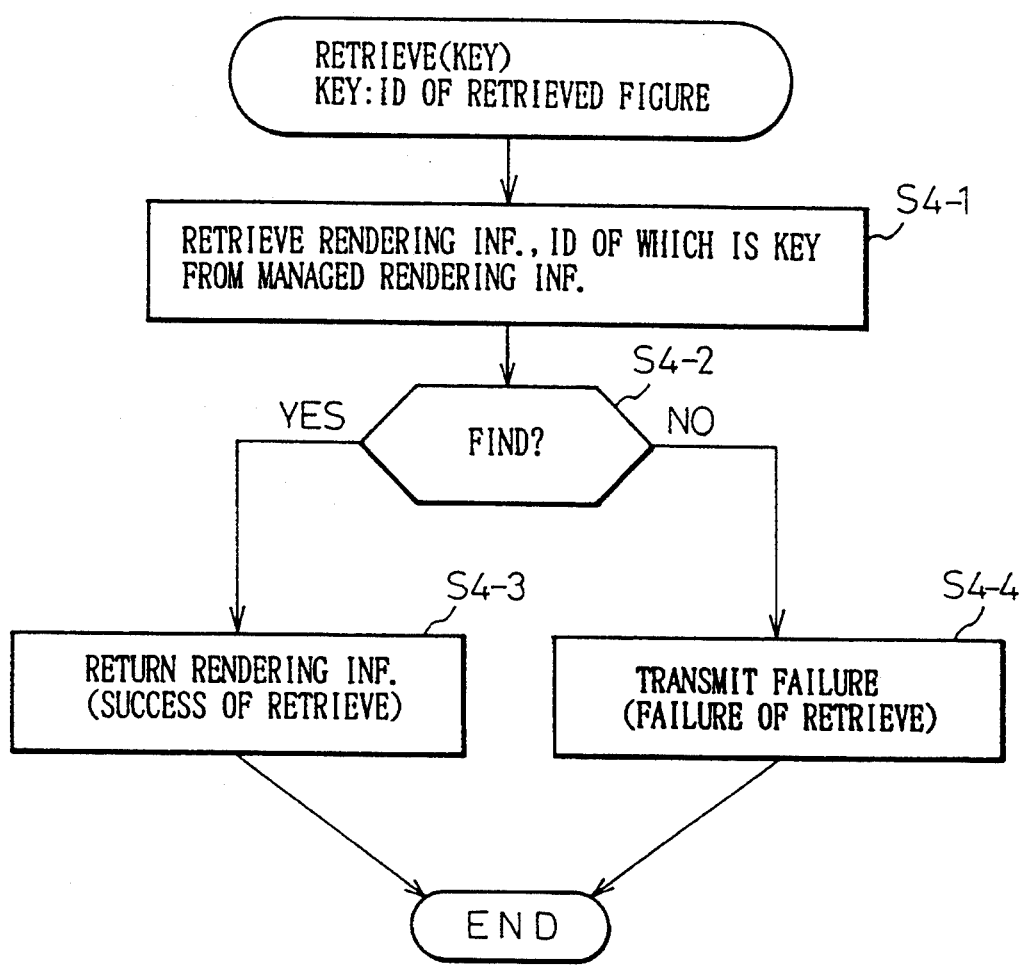
FIG. 4 is a flowchart showing retrieval of rendering information according to the embodiment.

In FIG. 4, the flowchart showing the process of retrieving rendering information is shown.

Upon receipt of an instruction which designates the identifier of the figure from the application processor 11, the figure display processor 13 transmits the request of the retrieve by an identifier of the figure to be retrieved, to the rendering information managing part 15. On the other hand, the rendering information managing part 15 searches its managing rendering information by the identifier (FIG. 4, S4-1).

In a process S4-2, if rendering information having the same identifier is found, the rendering information is returned back by a success of the retrieve, in a process S4-3. If the rendering information having the same identifier is not found, the failure of the retrieval process is reported in a process S4-4.

Figure 5:
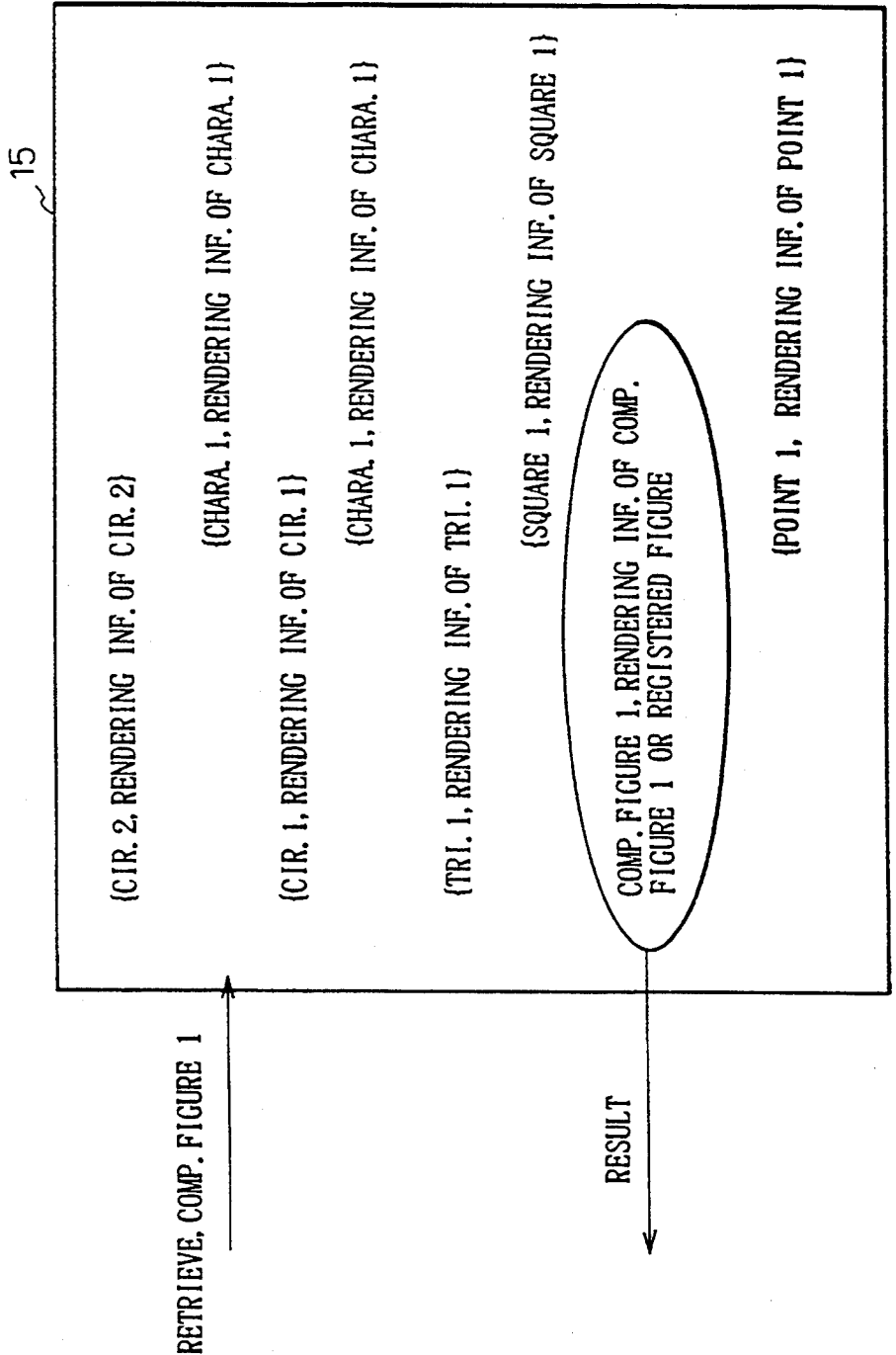
FIG. 5 is a diagram explaining management of rendering information in the case of a composite figure according to the embodiment.

FIG. 5 is an explanatory diagram showing management of rendering information of a composite figure.

The rendering information managing part 15 includes information to manage identifiers of a plurality of figures. By giving the identifier to the composite figure, a plurality of figures are handled as a group. The identifier of the composite figure is handled the same as the identifier of a single figure. For example, as shown in FIG. 5, when a request of the retrieve whose key is "COMPOSITE FIG. 1", is supplied, the "rendering information of the composite FIG. 1", "registered identifier information of the figure" and the like are returned as a result.

Figure 6:
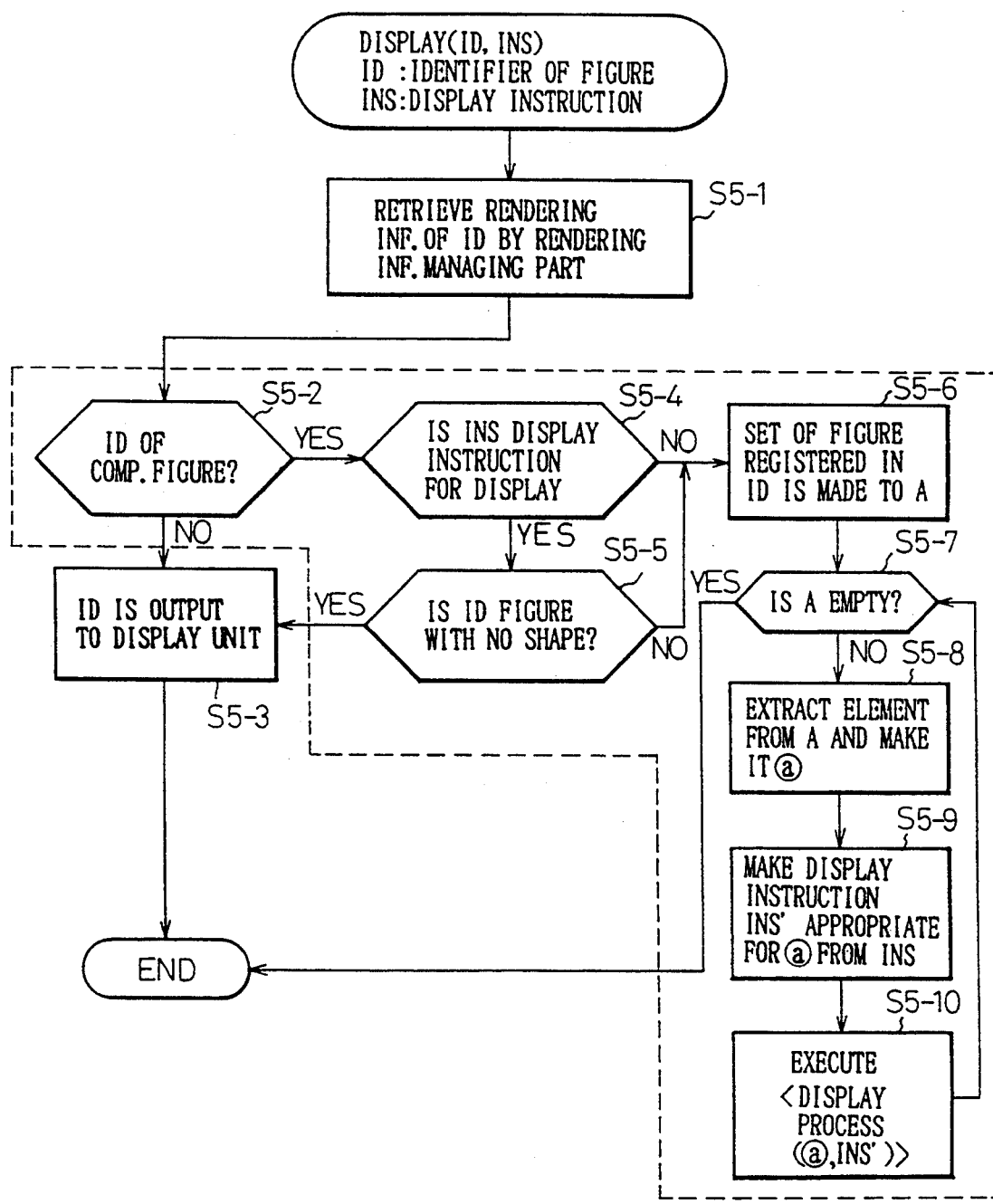
FIG. 6 is a flowchart showing a process of displaying a composite figure according to the embodiment.

In FIG. 6, a display processing flow of the composite figure is shown. The portions enclosed by the broken line relate to the composite figure.

S5-1: For example, when the application processor 11 supplies a display request which designates the identifier (ID) of the figure and the instruction (INS) of the display instruction, the figure display processor 13 retrieves the rendering information from the rendering information managing part 15 using the identifier as the key.

S5-2: In accordance with the retrieval result, it is determined whether the figure having the designated ID is a composite figure or not. If the figure is a composite figure, the process goes to a process S5-4.

S5-3: By using the rendering information having the designated ID, the figure is displayed on the display unit 17 and the display process ends.

S5-4: If the figure is a composite figure, the process determines whether instruction (INS) is a display instruction or not. If it is not a display instruction, the process goes to S5-6.

S5-5: If the instruction (INS) is a display instruction, it is determined whether the rendering information of the designated ID has a shape or not. If the rendering information has a shape, the process goes to process S5-3, and the figure having the shape is displayed. If the figure not having the shape, the process goes to S5-6.

S5-6: A set of a figures registered by the designated ID is defined as A.

S5-7: Until A becomes empty, the following processes from S5-8 to S5-10 are repeated. If A becomes empty, the display process ends.

S5-8: If A is not empty, an element is extracted from A and the extracted element is defined as ⓐ.

S5-9: Based on the instruction (INS) of the display instruction, an instruction (INS') which is appropriate for ⓐ is created.

S5-10: The instruction for executing the INS' is supplied to ⓐ. Namely, by using a recursive-call, the process <display process (ⓐ, INS')> is executed. When the process ends, the process returns to S5-7 and these processes are repeated.

Next, a metamorphosis of the figure according to the embodiment of the invention is explained. FIG. 7 is an explanatory diagram showing a metamorphosis of the figure, and FIG. 8 shows a metamorphosis processing flow by using the figure display processor 13.

For example, it is assumed that the shape of the figure is changed from a circle to a triangle. In this embodiment, the application processor 11 can change the rendering information automatically, only by designating the identifier of the figure of the circle and the shape "triangle" after the metamorphosis. By using this metamorphosis function, the animation is created easily, wherein the movement of the particle which changes the shape, for example, as shown in FIG. 1B is displayed.

Figure 7A:
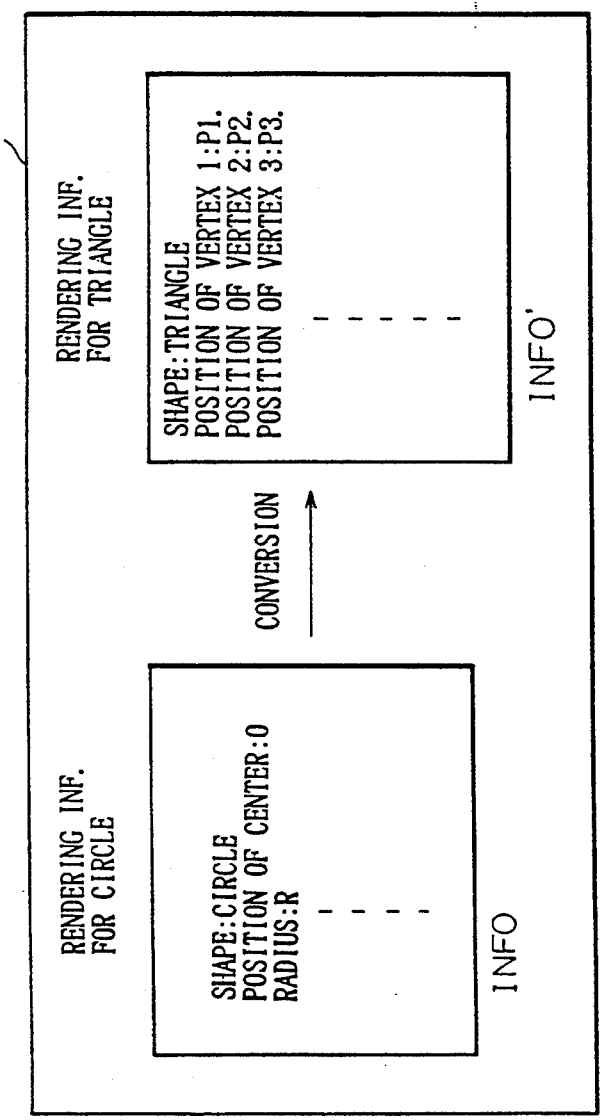
FIG. 7A and FIG. 7B are explanatory diagrams showing metamorphosis of a figure according to the embodiment.

As shown in FIG. 7A, for the figure, whose shape is a circle, the position of the center and the radius are necessary as the rendering information for displaying the circle on the display unit 17. While, for the figure, whose shape is a triangle, the positions of the three vertices are necessary. Therefore, by receiving the instruction by which the shape of the figure is changed, the position and size in the rendering information is converted in accordance with the characteristics of the figure.

When the rendering information of a circle is converted to the rendering information of a triangle, to determine the position of the three vertices, the inscribed triangle to the circle is calculated, and the coordinates of the vertices P1, P2, and P3 are determined. By the default strategy, the equilateral triangle wherein one of its vertices is on the vertical line through the center of the circle is an object to be converted. As a metamorphosis strategy, the user can determine the strategy. For example, lying triangle on its side, the circumscribed triangle to the circle can be selected as a shape after the metamorphosis.

Figure 7B:
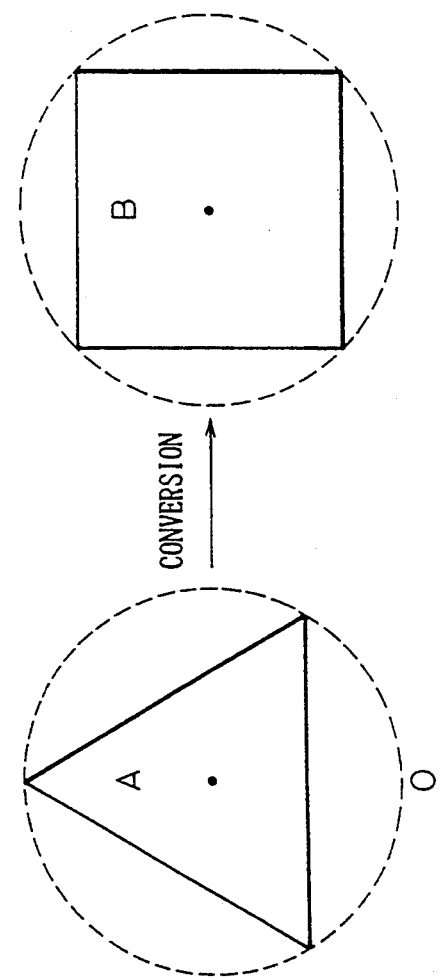

In FIG. 7B, an example of positioning is shown, when the triangle is metamorphosed to the square. The circumscribed circle 0 is used as an area including the triangle A before metamorphosis. The square B after the metamorphosis is the inscribed square to the circumscribed circle 0 to the triangle A.

This process is executed, for example, as shown in FIG. 8. According to the example wherein the figure of the circle metamorphoses to the triangle, the processes from S8-1 to S8-6 in FIG. 8 are explained.

S8-1: In the metamorphosis instruction, the identifier (ID) of the figure of a circle and the metamorphosing shape (SHAPE=TRIANGLE) are designated. The figure display processor 13 retrieves the rendering information of the designated ID from the rendering information managing part 15. The name of the area of the rendering information is named INFO.

S8-2: The rendering information necessary to display the shape after the metamorphosis is generated, and the area of the necessary rendering information is defined as INFO'.

S8-3: The shape of the figure in INFO' is initialized as SHAPE=TRIANGLE.

S8-4: The area O including the figure designated by ID is obtained.

S8-5: To display the shape in the area O, the position and size in the INFO' are initialized.

S8-6: The rendering information of INFO' is registered again in the rendering information managing part 15, as the new rendering information designated by ID.

For example, in the case where the shape of the figure is a circle and unsuitable instruction for the circle is supplied, for example, the change of the rendering information other than center position or radius or the like; in accordance with the instruction information, if the instruction is supplied to the rendering information without any correction, an appropriate display of the figure is not possible. Further, in the case where the shape of the figure is character string and an unsuitable instruction for the character string is supplied, for example, the change of the rendering information other than position, font, and displayed character string or the like, also an unfavorable state is generated. Namely, in the case of change of the rendering information, each figure should behave differently from each other based on its shape.

Figure 9:
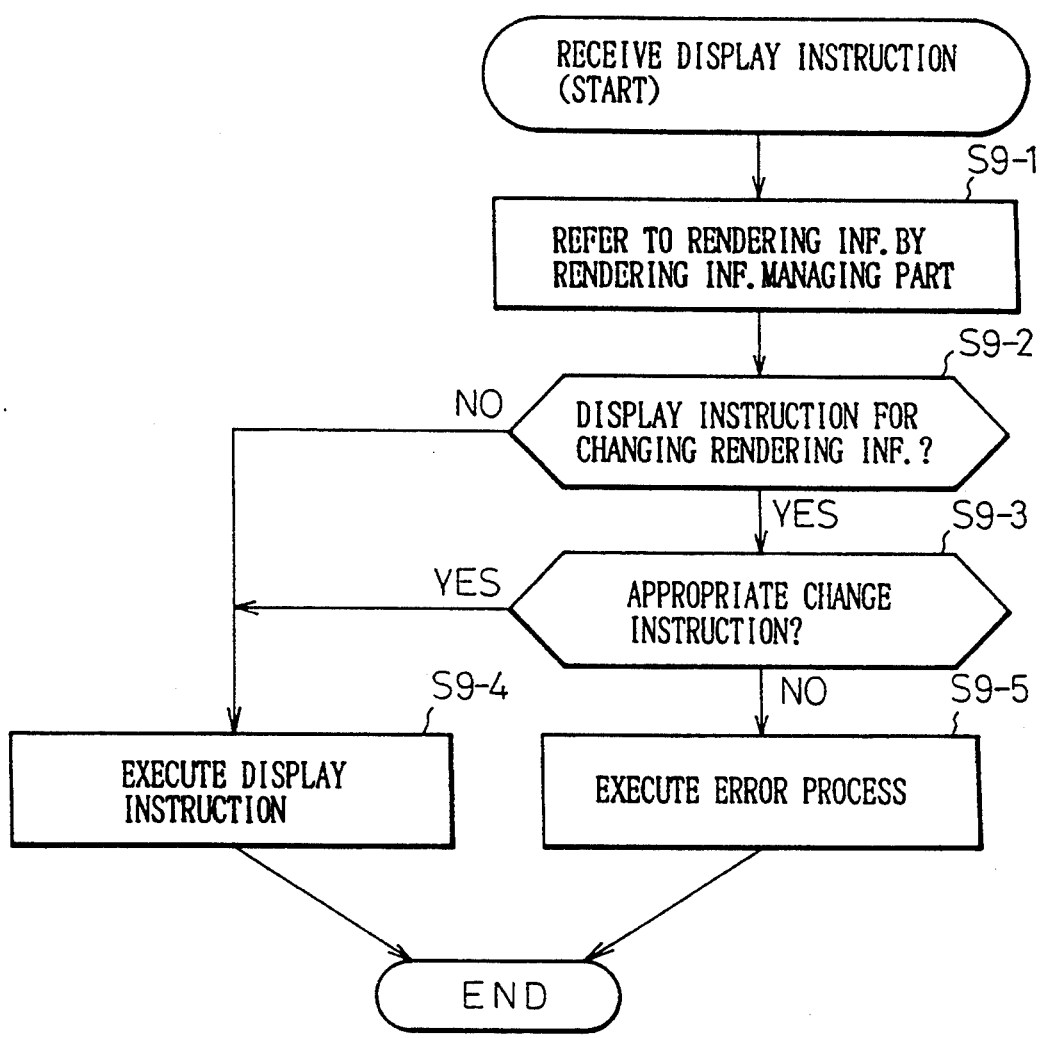
FIG. 9 is a flowchart showing processes of a display instruction filtering part in the embodiment.

Accordingly, the display instruction filtering part 14 shown in FIG. 2 is used and checks whether the instruction is appropriate based on the shape of the figure. In FIG. 9, the processing flow in the display instruction filtering part 14 is shown.

S9-1: If the display instruction which changes the rendering information is received, the rendering information managing part 15 refers to the rendering information.

S9-2: It is determined whether the display instruction changes the rendering information or not. If the rendering information is not changed, the process goes to S9-4.

S9-3: In the case where the display instruction changes the rendering information, it is determined whether an appropriate change instruction or not in consideration of the shape of the figure. If the change instruction is valid, the process goes to S9-4, and if invalid, the process goes to S9-5.

S9-4: The designated display instruction is executed and the process ends.

S9-5: If an unsuitable change instruction is supplied, the instruction is ignored or a processed as an error, for example, the error message is output and the process ends.

As shown in FIG. 2, the processing request from the application processor 11 to the figure display processor 13 is executed by using the figure operation instruction means 12. The figure operation instruction means 12 can be implemented by the various utilizable means, for example, by a command, a function, a macroinstruction, the application program, and the like. The concrete examples implemented as function calls are explained below.

The format of the function is name of function (parameter 1, parameter 2, ... ). Its parameter is supplied to the function executing part (figure display processor 13) as an input signal. In the following description, the specification of the function is explained, picking up the following two items.

Output: What value does the function return back?
Processing: How does the function process?

It is easy that by this explanation, the actual executive part of the function is implemented. Of course, the embodiment of the invention is not limited to the above explanations and various changes are possible.

[Function for operating the figure]

The function for operating the figure which the application processor 11 uses, is executed by the figure display processor 13. For example, there may exist the following functions.

Framing (initializing for the shape of the figure and the rendering information)

Output: The name (identifier) of the figure whose rendering information is initialized by the parameter.

Processing: The rendering information of the figure is framed and the rendering information is initialized by the parameter.

Extinction (name of the figure)

Output: Flag designating whether the extinction is successful or not.

Processing: The rendering information of the figure is extinct.

Display (name of the figure)

Output: Flag designating whether the display is successful or not.

Processing: The figure is displayed on the screen.

Erasion (name of the figure)

Output: Flag designating whether the erasion is successful or not.

Processing: The figure is erased from the screen.

Movement (name of the figure, moving position)

Output: Flag designating whether the movement is successful or not.

Processing: The figure is moved to the position designated by the absolute coordinates.

Movement (name of the figure, moving value from the current position)

Output: Flag designating whether the movement is successful or not.

Processing: The figure is moved by the moving value from the current position which is designated by the relative coordinates.

Blink (name of the figure, speed, number of times)

Output: Flag designating whether the blink is successful or not.

Processing: The figure is turned on and off in accordance with the speed and by number of blinked times.

Symmetrical movement to a point (name of the figure, coordinates of the basic point)

Output: Flag designating whether the symmetrical movement to a point is successful or not.

Processing: The figure is moved symmetrically to the basic point.

Symmetrical movement to an axis (name of the figure, the equation of the basic axis)

Output: Flag designating whether symmetrical movement to an axis is successful or not.

Processing: The figure is moved symmetrically to the basic axis.

Change of the rendering information (name of the figure, a kind of the rendering information to be changed, changing value)

Output: A value before change.

Processing: The designated value in/of the rendering information of the figure is changed.

For example, inclination of the line, positions of both the ends of the line, line pattern, position of the center of the circle, radius of the circle, length of three vertices of the triangle, positions of three vertices of the triangle, foreground color, background color, filling pattern, a kind of fonts of the character string, contents of the character string (displayed character string), picture or pattern represented by some data format, for example, bit-map or pix-map and so on.

Metamorphosis (name of the figure, shape after metamorphosis, metamorphosis strategy)

Output: The shape before change.

Processing: The figure is metamorphosed.

Simultaneously, the rendering information is also converted. The conversion of the rendering information, when the metamorphosis strategy is given, is executed the same. The metamorphosis strategy is a designation of the rule specifying a method of the metamorphosis or routine introduced by user, and is a structure for selecting method of metamorphosis by a user. The customize regarding the metamorphosis is possible by registering the processing structure of the necessary rule or conversion routine of the rendering information created by a user as an output routine from the function executive part. If the metamorphosis strategy is not given, the process refers to the default strategy.

Addition to the group (name of composite figure, list of name of additional figure)

Output: Flag designating whether the addition is successful or not.

Processing: The given figure is added in the figure managed by the composite figure.

Deletion from group (name of composite figure, list of name of the figure)

Output: Flag designating whether the deletion is successful or not.

Processing: The given figure is deleted from the figure managed by the composite figure.

Retrieve from group (name of composite figure, name of retrieving figure)

Output: Flag designating whether the retrieve is successful or not.

Processing: It is examined whether the given figure exists or not in the figure managed by the composite figure.

The above functions are provided for utilizing the application processor 11. Besides, to request the processing to the rendering information managing part 15 by the figure display processor 13, inside, the following function for metamorphosis, function for managing the rendering information, and function for composite figure are provided. Next, these are explained.

[Function for metamorphosis]

Conversion of the rendering information (name of the figure, shape after metamorphosis)

Output: Flag designating whether the conversion is successful or not.

Processing: The rendering information of the figure is retrieved from a database, and to display the shape after metamorphosis, the rendering information is converted to the necessary rendering information. The old rendering information is deleted from the database, and the new rendering information is added to the database.

Filtering (name of the figure, display instruction)

Output: Flag designating whether the display instruction is appropriate or not for the figure.

Processing: The rendering information of the figure is retrieved from the database, and the shape is examined. It is determined whether the display instruction is correct or incorrect, in accordance with the shape of the figure.

[Function for managing the rendering information]

Addition of the rendering information (name of the figure, additional rendering information)

Output: Flag designating whether the addition is successful or not.

Processing: The rendering information of the figure is added to the database.

Deletion of the rendering information (name of the figure)

Output: Flag designating whether the deletion is successful or not.
Processing: The rendering information of the figure is deleted from the database.
Retrieve of the rendering information (name of the figure)
Output: Name of the retrieved rendering information.
Processing: The rendering information of the figure is retrieved from the database. If the rendering information is found, the name of the rendering information is come back. If not found, the special value designating failure of the retrieve is come back.

[Function for composite figure]

Scheduling (name of the composite figure, display instruction)
Output: Flag designating whether the scheduling is successful or not.
Processing: The rendering information of the figure is retrieved from the database, and the name of managing figure is examined. To the managing figure, the appropriate display instruction is supplied.

Figure 11:
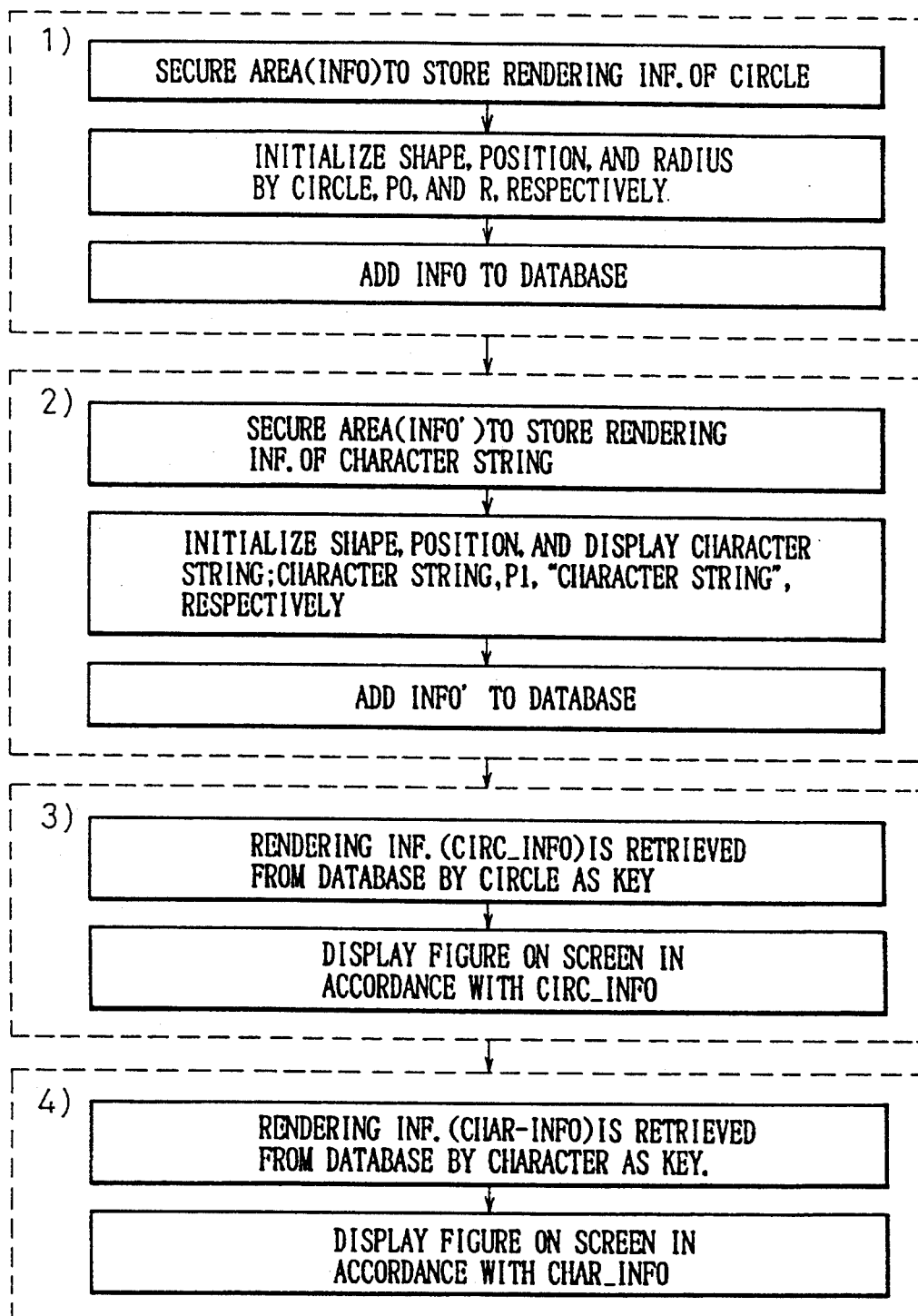
FIG. 11 and FIG. 12 are diagrams showing an example of execution of the function cells in FIG. 10.
Figure 12:
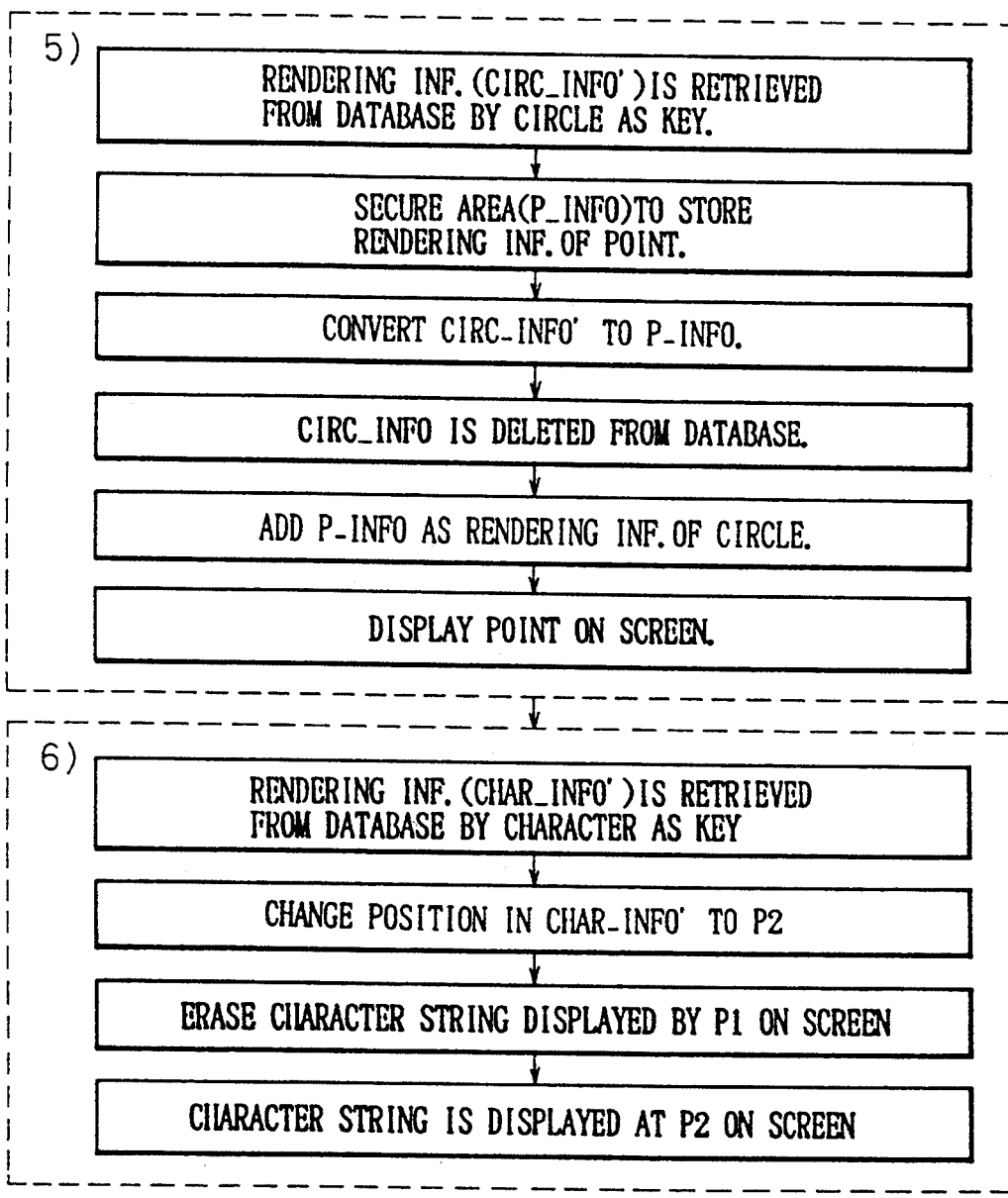

In FIG. 10, the example of the application is shown in the application processor 11 using these functions. FIG. 11 and FIG. 12 are diagrams showing an executive example of the function stream shown in FIG. 10.

As shown in FIG. 10, if the application processor 11 calls function, the figure display processor 13 and the rendering information managing part 15 execute the process as shown in FIGS. 11 and 12.

1) circle=Framing (circle, P0, R);

This statement designates that the rendering information having center of P0 and radius of R in the circle is framed, and the name (identifier) of the figure is come back to a variable circle.

Regarding the above processing, the processing shown in FIG. 11, 1) is executed. Namely, the area (INFO) is secured to store the rendering information of the circle and the rendering information is initialized the shape as circle, the position as P0, and the radius as R in the INFO. The INFO is added to the database of the rendering information in the rendering information managing part 15.

2) character=Framing (character string, P1, "character string");

This statement designates that the rendering information of the character string, the content of which is "character string" at the position P1, is framed, and the name (identifier) of the figure is come back to a variable character. In addition, in this embodiment, the character string is handled as a kind of the shape of the figure.

In this statement, the process shown in 2) of FIG. 11 is executed. Namely, the area (INFO') for storing the rendering information of the character string is secured and the shape in the INFO' is initialized as character string, the position in the INFO' is initialized as P1, and the character string to be displayed in the INFO' is initialized as "character string". The INFO' is added to the database of the rendering information in the rendering information managing part 15.

3) display (circle);

The display of the figure having the identifier designated by circle is instructed. As shown in 3) of FIG. 11, the rendering information (CIRC_INFO) is retrieved from the database as key of circle. The figure of the circle is displayed on the screen, in accordance with the retrieved CIRC_INFO.

4) Display (character);

The display of the figure having the identifier designated by character is instructed. As shown in 4) of FIG. 11, the rendering information (CHAR_INFO) is retrieved from the database as key of character. The figure of "character string" is displayed on the screen, in accordance with the retrieved CHAR_INFO.

5) Metamorphosis (circle, point);

The conversion from the figure having the identifier designated by circle to the figure having the shape of point is instructed.

In this statement, the process shown in 5) of FIG. 12 is executed. First, by the key of circle, the rendering information (CIRC_INFO') is retrieved from the database. In addition, the area (P_INFO) for storing the rendering information of point is secured. The retrieved CIRC_INFO' is converted to P_INFO. In detail, the shape is changed from circle to point, the position of P0 leaves as it is, and the radius R is cleared. The original CIRC_INFO is deleted from the database. Then, P_INFO is added as rendering information of circle. Finally, the figure of point converted on the screen is displayed.

6) Movement (character, P2);

This statement instruct that the figure having identifier designated by character is moved to the position of P2. As shown in 6) of FIG. 11, the rendering information (CHAR_INFO') is retrieved from the database as a key of character. The position in the retrieved CHAR_INFO' is changed to P2. The character string displayed at the position P1 on the screen is erased. Then, the figure of "character string" is displayed at the position P2 on the screen.

In the conventional figure display system, when the above process is executed, the processes, for example, shown in FIG. 11 and FIG. 12 must be executed in the application processor, however, in this embodiment, only by the display instruction shown in FIG. 10, easily, framing, displaying, and changing of the figure can be carried out.

As explained above, by using the present invention, the processes executing the management of the rendering information of the figure, the change of the shape of the figure, the change of the behavior of the figure, and the handle of the composite figure are easily realized by the application processor. Accordingly, the person who creates the application processor is not suffered the over load, and a high technological display on the display unit is possible. Thus, aid of the creation of the application program which needs the high class graphical user interface, for example, computer graphics, animation, or the like, can be carried out.

We claim:

1. A figure display system having a processing unit for processing data and a display unit for displaying a figure, comprising:

an application processor for displaying the figure, in accordance with a request from a user;

a figure display processor for transferring the figure to the display unit, upon receipt of an instruction from the application processor;

a rendering information managing part having means for retrieving a rendering information from an identifier of the figures means for changing the rendering information, and for managing, in a pair, the identifier of the figure displaying on the display unit and the rendering information including a shape and a position information of the figure; and figure operation instruction means for supplying an instruction from the application processor to the figure display processor, and for executing operations of at least framing, extinction, display, erasion, and metamorphosis of the figure, wherein:

the figure display processor, wherein includes:

means for retrieving the rendering information from the rendering information managing part, in response to the request from the application processor using the figure operation instruction means, means for determining the shape, movement and/or transformation of the figure in accordance with the rendering information, for executing the display process to the display unit, and means for converting the shape information in the rendering information to the shape information after metamorphosis by the special request of the metamorphosis instruction.

2. A figure display system as set forth in claim 1, wherein the figure display processor includes a display instruction filtering part for determining and selecting whether an instruction is appropriate or not, the instruction changes the rendering information in response to the shape of the figure from the application processor using the figure operation instruct means; and when the display instruction is not appropriate, a predetermined error process starts.

3. A figure display system as set forth in claim 2, wherein:

the rendering information managing part includes managing means for handling a plurality of rendering information as a whole by using the identifier of the figure given to the composite figure comprised of a plurality of rendering information; and the figure display processor, when an identifier of the figure included in the instruction from the application processor using the figure operation instruction means, is an identifier relating the composite figure, the instructed process is executed for a plurality of figures, in accordance with a plurality of rendering information defined by the identifiers.

4. A figure display system as set forth in claim 1, wherein:

the rendering information managing part includes managing means for handling a plurality of rendering information as a whole by using the identifier of the figure given to the composite figure comprised of a plurality of rendering information; and the figure display processor, when an identifier of the figure included in the instruction from the application processor using the figure operation instruction means, is an identifier relating the composite figure, the instructed process is executed for a plurality of figures, in accordance with a plurality of a rendering information defined by the identifiers.

5. A figure display method having a central processing unit and memory, for processing a figure data by an execution of a programmed instruction and for displaying a figure, comprising the steps of:

inputting the data and position information through a keyboard, in accordance with a request of a user from an input unit;

retrieving a rendering information using an identifier of a figure to be displayed;, determining a shape, movement, or transformation of the figure in accordance with the rendering information; and converting the shape information in the rendering information to the shape information after metamorphosis upon receipt of the request of instruction of metamorphosis.

6. A figure display method as set forth in claim 5, further comprising the steps of filtering to determine and select whether the instruction by which the rendering information metamorphoses in response to the shape of the figure, is appropriate or not; if the display is not appropriate, executing an error process.

7. A figure display method as set forth in claim 6, further comprising the steps of:

handling a plurality of rendering information as a whole, by using an identifier of the figure which is given to a composite figure comprised of a plurality of rendering information; and executing instructed process to a plurality of figures, in accordance with a plurality of rendering information defined by the identifier when the identifier of the figure is an identifier relating the composite figure.

8. A figure display method as set forth in claim 5, further comprising the steps of:

handling a plurality of rendering information as a whole, by using an identifier of the figure which is given to a composite figure comprised of a plurality of rendering information; and executing instructed processes to a plurality of figures, in accordance with a plurality of rendering information defined by the identifier when the identifier of the figure is an identifier relating the composite figure.

* * * * *